Aug. 6, 1940.   J. H. VICTOR ET AL   2,210,823
LATERALLY EXPANDED OIL SEAL
Filed Dec. 29, 1939
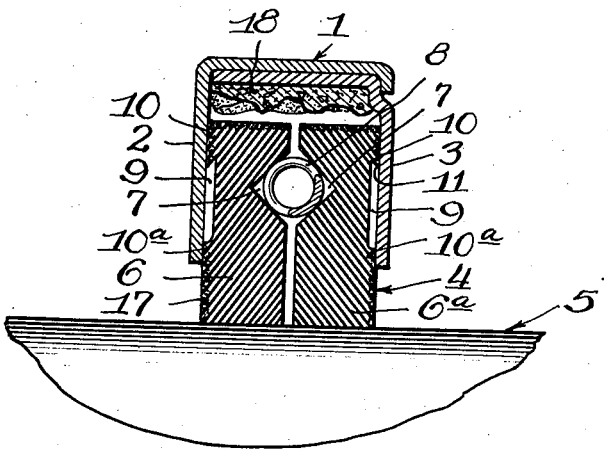
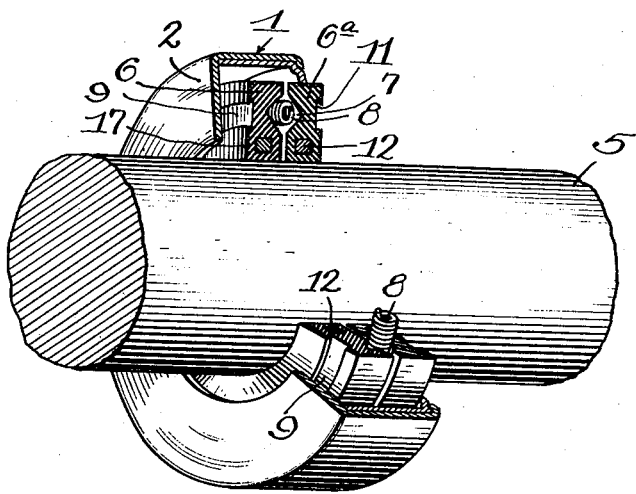
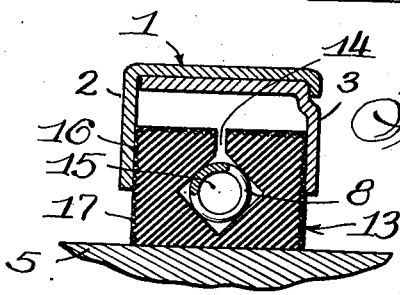
INVENTORS.
John H. Victor
and Wilburn F. Bernstein
Parkinson & Lane ATTORNEYS.

Patented Aug. 6, 1940

2,210,823

UNITED STATES PATENT OFFICE 2,210,823

LATERALLY EXPANDED OIL SEAL

John H. Victor, Wilmette, and Wilburn F. Bernstein, Brookfield, Ill., assignors to Victor Manufacturing & Gasket Company, Chicago, Ill., a corporation of Illinois Application December 29, 1939, Serial No. 311,494

3 Claims. (Cl. 288—3)

The present invention relates to an oil or fluid seal and more particularly to an oil seal so constructed and arranged as to compensate for relatively great eccentricities and misalignments between a shaft and its housing or surrounding structure to seal against the passage or escape of lubricants, water and other cooling and industrial fluids, and against the entrance of dust and other foreign particles. In the novel embodiment disclosed, the seal construction comprises a split or sectional sealing diaphragm or element adapted to be mounted by a press fit upon a rotatable shaft, and a confining shell or enclosing casing in which the diaphragm rotates and which shell or casing is mounted within the housing or surrounding structure.

In the present novel construction, the spaced sealing surfaces of the sectional or split dia-sealing surfaces of the sectional or split diaphragm or sealing member are located within the channelled portion of the confining shell and so arranged as to produce an optimum sealing efficiency with a minimum of frictional resistance between the relatively rotatable parts. By reason of this construction, the diaphragm or sealing element may be securely mounted upon a shaft having an irregular or rough contour or surface, and its sealing face maintained in continuous sealing contact by means of a garter spring or the like exerting an outward pressure or force tending to maintain the sealing member in sealing relationship with its confining shell.

In the illustrative embodiment, the sectional or split sealing member or diaphragm is formed with a substantially diamond-shaped annular opening or recess in which the garter spring seats and exerts a lateral or expansive force which presses the laterally movable sections into sealing contact with the shell or casing. This expansive effect is such as to maintain a sealing contact regardless of whether the shaft is stationary or rotating, but when the shaft is rotating at a relatively high speed, centrifugal action tends to force the spring radially outward, and since it is confined within an opening or recess provided in the diaphragm or sealing element, this centrifugal action on the spring will positively force the outer ends of the sealing sections into sealing contact with the confining shell.

The present novel construction, although providing a most effective seal for the purposes set forth, maintains the frictional resistance between the diaphragm or sealing element and confining shell at a minimum. This is accomplished by the novel sealing relationship and by the addition of graphite to the contacting or sealing surfaces of the sealing element.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while we have shown therein a preferred embodiment, it is to be understood that the same is susceptible of modification and change, and comprehends other details, arrangements of parts, features and constructions without departing from the spirit of the invention.

In the drawing:

Fig. 1 is a view in vertical cross section through the novel seal mounted on a rotatable shaft.

Fig. 2 is a fragmentary view in perspective of the novel seal mounted upon a shaft, the structure being identical with the construction of Fig. 1 except for the inclusion of a reenforcing washer.

Fig. 3 is a view similar to Fig. 1 but showing an alternate form of sealing diaphragm or member.

Referring more particularly to Figs. 1 and 2 of the drawing, the novel embodiment therein illustrated comprises a confining shell or enclosing casing 1 for the sealing element or diaphragm and consisting of a pair of angular sections 2 and 3 adapted to be suitably secured together to form an annular channel-shaped member adapted to encompass and confine a sectional or split sealing element or diaphragm 4. The sealing member 4 is press fitted upon the shaft 5 and is shown as comprising opposed or complementary sections 6 and 6ª. Each is provided with a substantially V-shaped annular recess 7 formed in its inner face for the reception of a garter spring 8 and an annular groove 9 formed in its contacting or wiping face to provide spaced sealing surfaces 10 and 10ª. In order to augment the sealing effect and prevent the entrance or passage of any lubricant or other fluid, dust, or other foreign particles into the interior of the seal and between its sealing surfaces, the groove 9 is under-cut at 11.

In Fig. 2 the sealing sections 6 and 6ª are reenforced by means of a metal washer or split ring 12 suitably embedded or encased within the material of the diaphragm in such manner as to add strength and rigidity to the assembly.

Fig. 3. discloses an alternate embodiment of the invention in which the sealing diaphragm or member 13, although split as at 14 and provided with a substantially diamond-shaped recess 15 for receiving and housing the garter spring 8, is formed as an integral unit in that it is united adjoining its inner diameter. In this form of the invention, the contacting or wiping faces 16 are not shown as grooved.

In the several illustrative embodiments of the invention, the contacting or wiping faces of the sealing member or diaphragm are preferably loaded with graphite 17 to materially reduce the frictional resistance of the sealing member and its wiping contact with the confining or retaining shell 1. Although the drawing does not show the housing or surrounding structure in which the shaft rotates, it is to be understood that the outer diameter of the confining shell is mounted, as by means of a tight press fit, in this housing or surrounding structure so that the seal construction effectively seals the space between the shaft and the surrounding housing. If desired, a suitable lubricant 18 may be packed or confined within the shell 1 for maintaining the diaphragm and sealing parts lubricated.

From the above description and the disclosure in the drawing, it will be readily seen that the novel oil seal herein disclosed will effectively seal the space between the shaft and surrounding housing against the escape or entrance of lubricants, industrial and other fluids, dust and other foreign particles, the sealing being effected in both directions. The novel sealing diaphragm or element and the garter spring carried within its confines are so constructed and arranged that the spring, either of the contractile or expansible type, applies its force or pressure against the angular surfaces of the recesses 7 and 15 when the shaft is not rotating, and when rotating, acts on the outer angular surfaces of these recesses due to the centrifugal action or force imposed on the spring, so that an effective sealing contact is maintained at all times between the diaphragm or sealing element and its confining shell 1 regardless of the eccentricity or misalignment existing in the shaft. The sealing diaphragm or element may be composed of any suitable sealing or packing material such as synthetic rubber or plastic material, leather in the form of natural sheet or fabricated of fiberized or shredded leather mixed with a suitable binder, etc.

Having thus disclosed the invention, we claim:

1. An external oil seal for sealing a rotatable shaft and its surrounding housing against the escape or passage of lubricants, water or other cooling or industrial fluids as well as dust or other foreign particles, comprising a confining shell of channel-shape adapted to be mounted in the surrounding housing and having inwardly extending side walls and a sealing member adapted to be mounted on the shaft for rotation therewith and having a wiping contact with the side walls of the shell, said sealing member being split to form spaced sections having opposed substantially V-shaped recesses, and a contractile spring seating within said recesses and engaging the inclined surfaces of said recesses to laterally force the split sections into wiping and sealing contact with the side walls of the shell.

2. A laterally expanded oil seal comprising an enclosing shell of channel-shape adapted to be mounted in a housing surrounding a rotatable shaft and having inwardly projecting side walls, and a sealing member adapted to be mounted by a press fit upon the shaft for rotation therewith and having a wiping contact with its enclosing shell, said member comprising a pair of spaced radially extending sealing elements having lateral sealing contact with the opposite side walls of the shell, said sealing elements each having an opposed substantially V-shaped recess and a garter spring within said recesses and engaging the inclined sides thereof to force said elements into sealing contact when the shaft is rotating or stationary, and a reenforcing washer embedded in the sealing member.

3. An oil and fluid seal comprising a channel-shaped confining shell adapted to be mounted in a housing surrounding a rotatable shaft and having inwardly projecting side walls, a sealing member adapted to be pressed upon and rotatable with the shaft and provided with opposed sealing faces, said member being split to provide a pair of sealing elements and each having an opposed, substantially V-shaped recess and a spring disposed within said recesses for laterally expanding the sealing elements and forcing their opposed sealing faces into wiping contact with the interior of the side walls of the confining shell to thereby effectively seal the space between the shaft and surrounding housing.

JOHN H. VICTOR.
WILBURN F. BERNSTEIN.